(12) United States Patent
Yuan et al.

(10) Patent No.: US 8,243,023 B2
(45) Date of Patent: Aug. 14, 2012

(54) METHOD OF SWITCHING INPUT METHOD EDITOR

(75) Inventors: Ye Yuan, Shenzhen (CN); Ruo-Yu Wang, Shenzhen (CN); Ruo-Jing Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 402 days.

(21) Appl. No.: 12/504,911

(22) Filed: Jul. 17, 2009

(65) Prior Publication Data
US 2010/0245251 A1    Sep. 30, 2010

(30) Foreign Application Priority Data

Mar. 25, 2009  (CN) .......................... 2009 1 0301103

(51) Int. Cl.
*G06F 3/02* (2006.01)
*G09G 5/00* (2006.01)
(52) U.S. Cl. ..... 345/169; 715/814; 715/864; 455/556.2; 455/566; 345/172
(58) Field of Classification Search .......... 345/168–172; 455/575.1–575.9, 556.2, 566; 715/814, 864
See application file for complete search history.

(56) References Cited

U.S. PATENT DOCUMENTS

| | | | |
|---|---|---|---|
| 6,744,422 B1 * | 6/2004 | Schillings et al. | 345/169 |
| 2003/0184451 A1 * | 10/2003 | Li | 341/22 |
| 2003/0197736 A1 * | 10/2003 | Murphy | 345/780 |
| 2004/0239533 A1 * | 12/2004 | Bollman | 341/22 |
| 2005/0043063 A1 * | 2/2005 | Dinn | 455/566 |
| 2005/0195171 A1 * | 9/2005 | Aoki et al. | 345/172 |
| 2006/0095843 A1 * | 5/2006 | Chou | 715/535 |
| 2006/0123354 A1 * | 6/2006 | Volovitz | 715/780 |

* cited by examiner

*Primary Examiner* — Lun-Yi Lao
*Assistant Examiner* — Gene W Lee
(74) *Attorney, Agent, or Firm* — Altis Law Group, Inc.

(57) ABSTRACT

A method is used to switch input method editors (IMEs) in a mobile phone. The mobile phone includes a switch key, a screen, and a group of information input keys. The method includes the following steps. The switch key is firstly pressed to switch to an Arabic numeral IME. An information input key is pressed to input information., Corresponding Arabic numeral is shown on the screen for being inputted. If the Arabic numeral is not accepted within a pre-set time, the screen shows a plurality of letters corresponding to the pressed key of the group of information input keys. One key is pressed to switch to an English letter IME, and a letter is chosen from the plurality of letters to input.

3 Claims, 4 Drawing Sheets

METHOD OF SWITCHING INPUT METHOD EDITOR

BACKGROUND

1. Technical Field

The present embodiment relates to methods of switching input method editor, and particularly to a method of switching input method editors in a mobile phone.

2. Description of Related Art

Today there are many devices and systems that require information entry by means of a keyboard having a relatively few data entry keys relative to multilingual information input, comprising mobile phones, electronic dictionaries, and so on. Usually, the mobile phone is equipped with a key entry system to input multiple characters of different numbers and languages, such as English, Arabic numerals, and so on. Often, a user will want to switch between different input method editors. However, it is usually inconvenient to switch between the input method editors.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
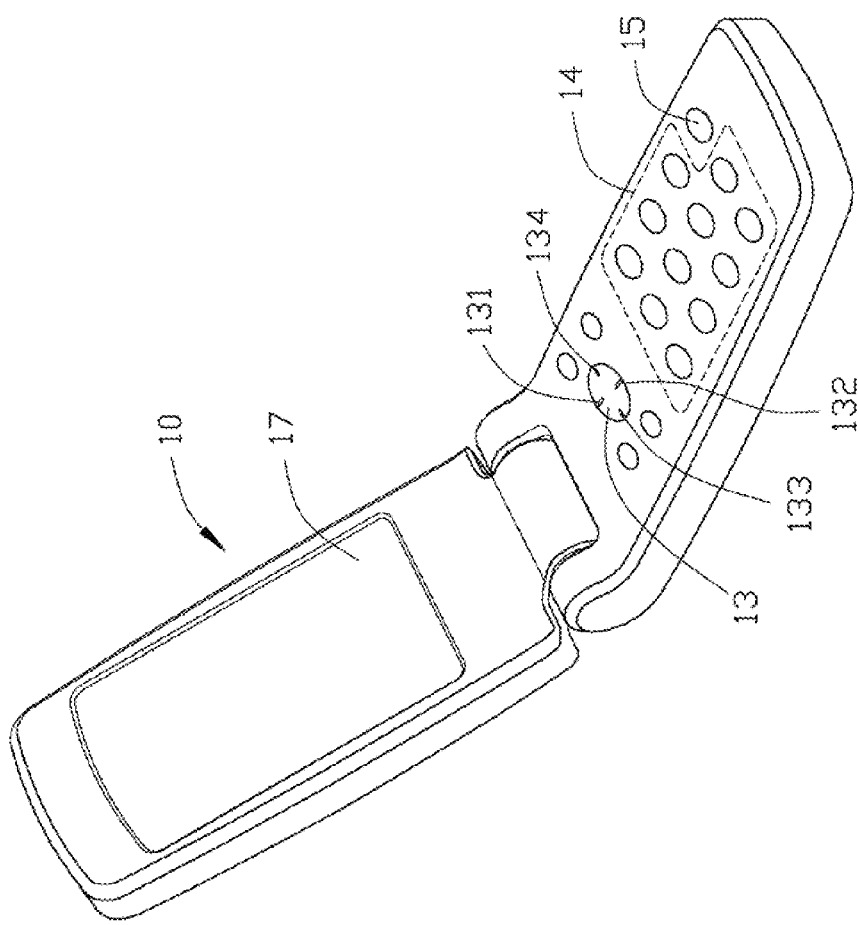
FIG. 1 is a schematic view of a mobile phone.
Figure 2:
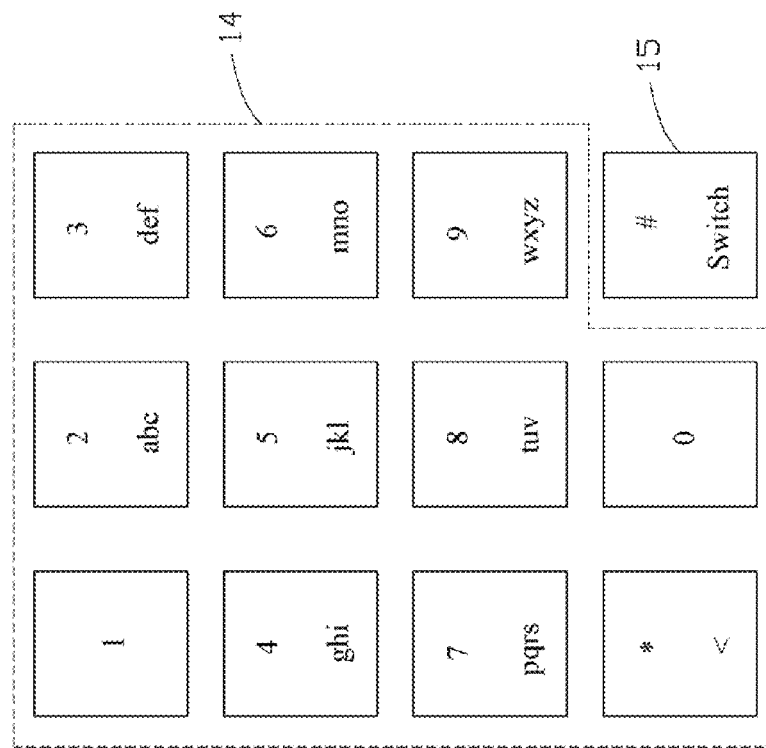
FIG. 2 is a schematic view of the keys of the mobile phone of FIG. 1.

Referring to FIGS. 1 and 2, a mobile phone 10 includes a screen 17 and a plurality of keys, which includes a group of information input keys 14, a switch key 15, and a group of direction keys 13. The group of direction keys 13 includes an up direction key 131, a down direction key 132, a left direction key 133, and a right direction key 134. A plurality of input method editors (IMEs) is installed in the mobile phone 10. In the present embodiment, there are two IMEs are installed in the mobile phone 10, which are an Arabic numeral IME and an English letter IME. The switch key 15 is used to switch the mobile phone 10 to a default IME, which is one of the two IMEs. For example, if the default IME is set to the Arabic numeral IME, and the present IME is the English letter IME, when the switch key 15 is pressed, the present input method is switched to the Arabic numeral IME.

Figure 3:
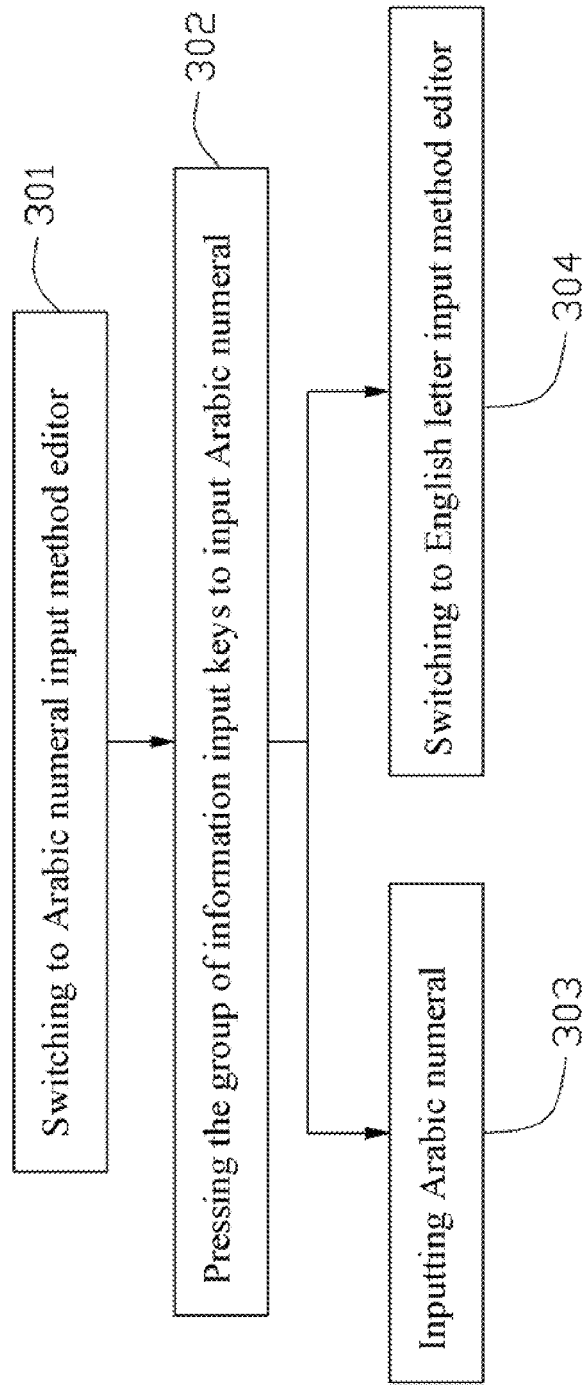
FIG. 3 is flow chart of a method of switching input method editor.
Figure 4:
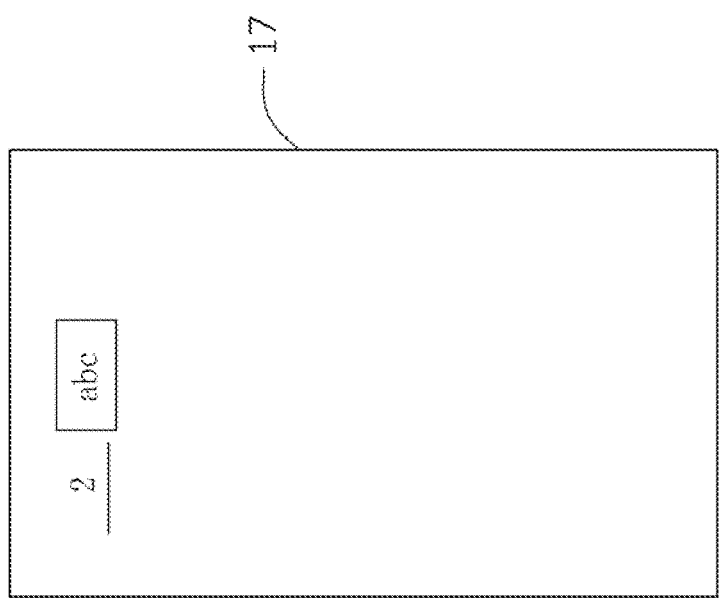
FIG. 4 is a schematic view of the screen of the mobile phone of FIG. 1.

The process of the embodiment is further described using the following illustrative example. Referring to FIGS. 3 and 4, the switch key 15 is pressed to switch to the default IME, such as Arabic numeral IME (step 301). The group of information input keys 14 is then pressed to input Arabic numerals (step 302). As shown in FIG. 4, if the user needs to input the Arabic numeral "2", the key "2" of the group of information input keys 14 is pressed. The Arabic numeral "2" is shown where indicated by a cursor on the screen 17. Then, the Arabic numeral "2" can be accepted for input by pressing any one of the group of information input keys 14 in a pre-set time, such as within two seconds (step 303). If there is no key being pressed in the pre-set time, a plurality of English letters "a", "b", "c", which correspond to the pressed key "2" of the group of information input keys 14, is shown at a right side of the cursor of the screen 17 (step 304).

In this state, if the right direction key 134 is pressed, the present IME of the mobile phone 10 is switched to the English letter IME, and the group of direction keys 13 are further pressed to choose a letter from the plurality of letters "a", "b", "c" (step 305).

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A method of switching input method editor (IME) in a mobile phone, the mobile phone comprising a switch key, a screen, and a group of information input keys, the method comprising the following steps:

pressing the switch key to switch to an Arabic numeral IME;

pressing an information input key, corresponding Arabic numeral being shown on the screen for being inputted;

accepting the Arabic numeral shown on the screen when any one of the group of information input keys is pressed within a pre-set time;

when the Arabic numeral is not accepted in the pre-set time, showing a plurality of letters instead of the Arabic numeral on the screen, wherein the plurality of letters and the Arabic numeral are marked on the same information input key;

pressing one key to switch to an English letter IME, and choosing a letter from the plurality of letters to input, wherein a cursor is shown on the screen, the Arabic numeral is located on the cursor, the plurality of letters is located at a right side of the cursor, and a right direction key is pressed to switch to the English letter IME.

2. A method of switching input method editor (IME) in a mobile phone, the mobile phone comprising a switch key, a screen, and a group of information input keys, the method comprising the following steps:

pressing the switch key to switch to a default IME;

pressing an information input key, a first character, which complies with the default IME, being shown on the screen for being inputted; and accepting the first character shown on the screen when any one of the group of information input keys is pressed within a pre-set time;

when there is no acceptance of the first character in the pre-set time, showing a plurality of second characters instead of the first character, the plurality of second characters complying with a second IME and being marked on the same information input key as the first character, wherein a cursor is shown on the screen, the plurality of second characters is located at a right side of the cursor, and a right direction key is pressed to switch to the second IME.

3. The method of claim 2, wherein the default IME is an Arabic numeral IME, the second input method is an English letter IME.

* * * * *